United States Patent [19]

Dicke et al.

[11] Patent Number: 4,948,863
[45] Date of Patent: Aug. 14, 1990

[54] THERMOTROPIC POLYESTER IMIDE FROM N-(3-HYDROXY PHENYL) TRIMELLITIC ACID IMIDE

[75] Inventors: Hans-Rudolf Dicke; Joachim Genz; Volker Eckhardt; Ludwig Bottenbruch, all of Krefeld, Fed. Rep. of Germany

[73] Assignee: Bayer Aktiengesellschaft, Leverkusen, Fed. Rep. of Germany

[21] Appl. No.: 341,621

[22] Filed: Apr. 21, 1989

[30] Foreign Application Priority Data

May 3, 1988 [DE] Fed. Rep. of Germany ....... 3814974

[51] Int. Cl.$^5$ .............................................. C08G 73/10
[52] U.S. Cl. .................................... 528/170; 528/176; 528/183; 528/185; 528/188; 528/193; 528/194
[58] Field of Search ............... 528/170, 176, 183, 185, 528/188, 193, 194

[56] References Cited

U.S. PATENT DOCUMENTS 4,383,105  5/1983  Irwin ................................... 528/170
4,760,124  7/1988  Matsumura et al. ................ 528/170
4,874,836  10/1989 Wakabayashi et al. ............. 528/170

Primary Examiner—Harold D. Anderson
Attorney, Agent, or Firm—Connolly & Hutz

[57] ABSTRACT

Thermotropic polyester imides having recurrent structural units corresponding to the following formulae:

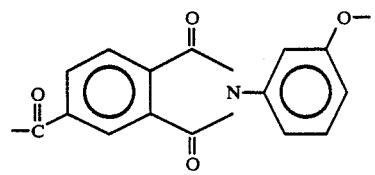

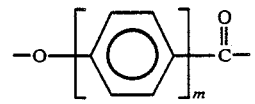

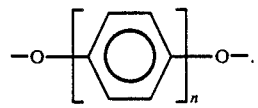

11 Claims, No Drawings

THERMOTROPIC POLYESTER IMIDE FROM N-(3-HYDROXY PHENYL) TRIMELLITIC ACID IMIDE

This invention relates to high molecular weight thermotropic polyester imides which have excellent heat distortion temperatures, to a process for their preparation and to their use for the production of moulded articles, filaments, fibres and sheet products.

Substances are regarded as "thermotropic" if they form liquid crystalline melts. Thermotropic polycondensates are well known. A summary of the literature is found, for example, in German Patent Application No. P 3 737 067, DE-OS 3 325 787 and EP-OS 134 959. These describe a method of investigating the liquid crystalline state of polymer melts.

Moulded articles produced from liquid crystalline melts of fully aromatic polycondensates have mechanical strength and rigidity of a standard not normally found in unreinforced polycondensate worked up from an isotropic melt. Thermotropic polycondensates are conventionally synthesized from monomers which result in rigid, rod shaped macromolecules or macromolecule segments. Thus, for example, liquid crystalline polyesters obtained from p-hydroxybenzoic acid, resorcinol and terephthalic acid (see e.g. DE-OS 2 025 971), from 2-hydroxy-6-naphthoic acid and p-hydroxybenzoic acid (see e.g. EP 22 344) and from p-hydroxybenzoic acid, 2,6-dihydroxynaphthalene and teraphthalic acid (see e.g. EO 1 340) have been described. These products can be processed thermoplastically but have the disadvantages of a relatively low heat distortion temperature i.e. below 160° C. Liquid crystalline polyesters which have a higher heat distortion temperature have also become known, e.g. the polyesters of p-hydroxybenzoic acid, isophthalic acid, hydroquinone and bisphenol-A (see e.g. EP 88 742). These products have, however, the disadvantage that as the heat distortion temperatures increase so the temperature required for processing also rises considerably and at heat distortion temperatures above 160° C. the temperatures required for thermoplastic processing are far above 300° C., mostly even above 330° C. Another disadvantage of the liquid crystalline polyesters hitherto known in their low surface strength and abrasion resistance.

It was therefore an object of the present invention to provide thermoplastically processible liquid crystalline polycondensates which have high heat distortion temperatures, can be processed from the liquid crystalline melt at low temperatures and have a high surface resistance and abrasion resistance. The new thermotropic polycondensates should preferably have a heat distortion temperature above 150° C., preferably above 160° C., and should form a liquid crystalline melt phase below 330° C., preferably below 300° C., most preferably below 290° C.

It has now surprisingly been found that polyester imides containing condensed residues of N-(3-hydroxyphenyl)-trimellitic acid imide, aromatic hydroxycarboxylic acids, aromatic dihydroxy compounds and aromatic dicarboxylic acids have the desired combination of advantageous properties.

The present invention relates to thermotropic polyester imides having recurrent structural units corresponding to the following formulae

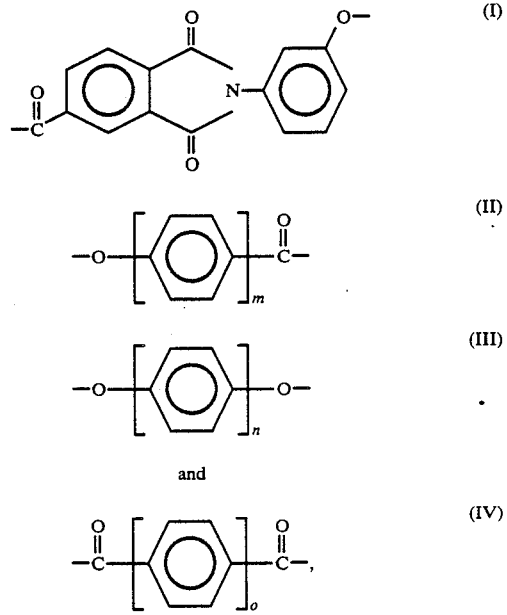

and containing the condensed residues (I) in a quantity of from 5 to 50 mol %, preferably from 8 to 45 mol % most preferably from 10 to 40 mol-% and (II) in a quantity of from 10 to 75 mol %, preferably from 15 to 73 mol %, most preferably from 20 to 70 mol %, based on the sum of the condensed residues (I), (II), (III) and (IV). The molar ratio of the condensed residues (III)/(IV) is from 0.95 to 1.05 and the total concentration of the condensed residues (I) and (II) is from 10 to 85 mol %, preferably from 30 to 80 mol %, based on the sum of the condensed residues (I) to (IV), and in the above formulae, m, n and o may assume the values 1 and 2.

The structural unit (I) is derived from N-(3-hydroxyphenyl)-trimellitic acid imide or its reactive derivatives such as its aryl esters or acyl esters. N-(3-Hydroxyphenyl)-trimellitic acid imide may be prepared from m-aminophenol and trimellitic acid anhydride by methods known from the literature (see K. Kwita and S. Matsuda, Makromol. Chem., 184, 1223 (1983)).

The structural unit (II) is derived from p-hydroxybenzoic acid and/or 4-hydroxy-4'-biphenyl carboxylic acid or reactive derivatives thereof such as the aryl esters or acyl esters.

The structural unit (III) is derived from hydroquinone and/or 4,4'-dihydroxydiphenyl or the reactive derivatives thereof, such as the acyl esters.

The structural unit (IV) is derived from terephthalic acid and/or 4,4'-bis-phenyl-dicarboxylic acid or the reactive derivatives thereof, such as the aryl esters.

The polyester imides according to the invention may contain the units of residues (I) and (II) in random distribution or in blocks. It should be noted, however, that relatively long blocks of these units considerably increase the fusion viscosity and the melting point of the resulting products.

The polyester imides according to the invention may contain end groups in the form of COOH, H, MH, OC$_6$H$_5$, acyloxy or groups derived from chain breaking agents. Monofunctional aromatic hydroxyl compounds such as 4-hydroxydiphenyl, p-nonylphenol, 4-(1,1,3,3-tetramethyl-butyl)-phenol and β-naphthol and aromatic monocarboxylic acids such as diphenyl carboxylic acids and naphthalene carboxylic acids are preferred chain terminating agents. The chain breaking agents may be used in quantities of about 0.1 to 10 mol %, preferably from 0.5 to 5 mol %, the percentages being based on the sum of residues I, II and IV in the case of carboxylic acids and on residues I, II and III in the case of phenols.

Branching, trifunctional or higher functional, preferably aromatic monomers, such as phloroglucinol, 1,3,5-benzenetricarboxylic acid and/or 3,5-dihydroxybenzoic acid may also be used in quantities of about 0.1 to 2.0 mol %, preferably from 0.2 to 1.0 mol %, based on the sum of the residues I, II and III.

The polyester imides according to the invention are insoluble in the solvents tested by the present Applicants, such as p-chlorophenol and phenol/1,1,2,2-tetrachloroethane (ratios by weight 1:1).

The polyester imides according to the invention preferably have a fusion viscosity of less than 1000 Pa.s, preferably from 10 to 500 Pa.s, determined at a shearing velocity of $10^3$ sec.$^{-1}$ and using a nozzle with a length/diameter ratio of 20 at a temperature below 330° C.

The polyester imides according to the invention may be prepared by various processes, e.g. by condensation or transesterification of the hydroxy carboxylic acids, diphenols or dicarboxylic acids derived from residues I, II, III and IV or reactive derivatives thereof, followed by polycondensation (see R. W. Lenz, "Synthetic routes to liquid crystalline polyers" in "Recent Advances in Liquid Crystalline Polymers", Elsevier, N.Y., 1985).

Examples of preferred starting compounds include their aryl esters and acyl esters.

In one preferred process of synthesis, the lower acyl esters, preferably acetates of the hydroxy carboxylic acids derived from residues (I) and (II) and the diphenols derived from residues III are reacted with dicarboxylic acids derived from residues IV. In this process, the acyl esters may be prepared in situ.

According to another preferred process of synthesis, the hydroxycarboxylic acids derived from residues I are produced in situ by the reaction of trimellitic acid anhydride with 3-aminophenol and acetylated and then reacted without isolation with the lower acyl esters, preferably the acetates of hydroxy carboxylic acids derived from residues II, diphenols derived from residues III and dicarboxylic acids derived from residues IV.

These reactions may be carried out in the solvent-free melt phase but may also be carried out in the presence of a liquid, heat transferring medium with a high boiling point (see DE-OS 20 25 971).

The residues I, II, III and IV are incorporated in the polyesters in the proportion of the starting components.

Catalytic acceleration both of the condensation and transesterification reaction and of the polycondensation reactions may be indicated. The catalysts used for this purpose are known, e.g. Lewis acids and hydrohalic acids, oxides, hydrides, hydroxides, halides, alcoholates, phenolates, salts of inorganic or organic acids (preferably carboxylic acid salts), complex salts or mixed salts of alkaline earth metals such as magnesium or calcium and salts (including complex salts or mixed salts) of the sub-Group Elements such as vanadium, titanium, manganese, cobalt, nickel, zinc, lanthanum, cerium or zirconium or of the Elements from other Groups of the Periodic System, such as germanium, tin, lead and antimony; also, the alkali metals and alkaline earth metals as such, especially sodium. Further, sodium hydroxide, lithium acetate, sodium acetate, potassium acetate, calcium acetate, magnesium acetate, cobalt acetate, zinc acetate, calcium benzoate, magnesium acetyl acetonate, zinc acetyl acetonate, vanadyl-$C_1$-$C_8$-alkoxides, titanium alkoxides such as titanium tetrabutylate, titanium tetrapropylate and alkoxy titanium silicaates, zirconium butylate, zirconium propylate, titanium tetraphenolate, sodium phenolate, germanium dioxide, antimony trioxide, dialkyl and diaryl tin oxide, dibutyl tin diacetate and dibutyl-dimethoxy tin.

The quantities of catalyst are preferably from about 0.001 to 1% by weight, in particular from 0.01 to 0.2% by weight, based on the total weight of the monomers put into the process.

The polyester imides according to the invention may be prepared at temperatures of about 150 to 380° C., the temperature employed being generally low at the beginning of the reaction and continuously raised as the reaction progresses. A vacuum may be applied as the reaction slows down, in which case the pressure is preferably lowered continuously from normal pressure to about 0.1 mbar.

The product obtained may be subjected, as a granulate, or in powder form, to a solid phase after-condensation at a reduced pressure and at temperatures of about 150 to 300° C., preferably at 200° to 250° C. After 1 to 25 hours, the molecular weight has increased and the consequent properties of the polyester imide have markedly improved.

The invention thus also relates to a process for the preparation of the new polyester imides by the reaction of hydroxycarboxylic acids derived from residues I, which acids may be prepared in situ from trimellitic acid anhydride and 3-aminophenol, with hydroxycarboxylic acids derived from residues II and diphenols derived from residues III or the reactive derivatives of these compounds, which may also be produced in situ, and the dicarboxylic acids derived from residues IV, optionally in the presence of catalysts, chain breaking agents and branching agents, at temperatures from 150° to 380° C., optionally under reduced pressure.

Owing to their relatively low fusion viscosity, the thermotropic polyester imides according to the invention may advantageously be worked up from the melt for the production of injection moulding parts, filaments, fibres, bands and sheet products The shearing forces which occur in the process result in a molecular orientation which depends to a large extent on the magnitude of the shearing forces. The thermotropic polyester imides according to the invention also have a marked structural viscosity, i.e. the fusion viscosity drops sharply with increasing shearing forces. Suitable methods of working up the compounds include injection moulding, extrusion, pultrusion, pressure building, thermo-forming and melt spinning.

Moulded parts of high strength and rigidity and great toughness, especially in the region of low temperatures, and high elongation at break and high dimensional stability may be produced from the polyester imides according to the invention. Since the polyester imides also have high chemical resistance and good flame resistance, they are particularly suitable for the production of sheaths on beam wave guides, electronic products such as insulators, boards for printed circuits, plug and socket connections, sheaths for integrated circuits and parts of electric fittings, parts of chemical engineering installations such as pipes, container linings, rotors, anti-friction bearings, seals and filling bodies, and parts of medical engineering apparatus and parts of air conditioning plants and valve parts.

The polyester imides according to the invention may also be used as coating and covering material (pulverulent or dispersed). They are also eminently suitable for the preparation of reinforced or filled moulding compounds having a reinforcing and/or filler content of from 5 to 65% by weight, based on the moulding compounds containing reinforcing agents and/or fillers.

The invention further relates to the use of the new polyester imides for the production of moulded articles, filaments, fibres and sheet products.

EXAMPLES

The examination for thermotropic liquid crystalline behaviour was carried out by the process described in DE-OS 33 25 787. The dimensional stability under heat was determined by measuring the HDT.A temperature on rectangular rods (80 mm×10 mm×4 mm) in accordance with DIN 53 461 (ISO 75) (load: 181.5 N/mm$^2$).

EXAMPLE 1

The preparation of N-(3-hydroxyphenyl)-trimellitic acid imide is described in this example.

The following substances were weighed into a 6-l three necked flask equipped with KPG stirrer, reflux condenser, thermometer and nitrogen inlet:
190.75 g of m-aminophenol
403.2 g of trimellitic acid anhydride
3150 g of acetic acid.

The reaction mixture was heated to reflux in the course of 2 hours with stirring. After a further 4 hours under reflux, the reaction mixture was cooled and poured into 6 l of ice water. The product which precipitated was separated by suction filtration, washed with hot water and with hot isopropanol and dried. A yellowishgreen finely crystalline mass was obtained. The yield was 432.2 g=87.3% of the theory. The acid number was found to be from 196 to 201 (theoretical: 198).

EXAMPLE 2

The preparation of a polyester imide according to the invention from N-(3-hydroxyphenyl)-trimellitic acid imide, p-hydroxybenzoic acid, 4,4'-dihydroxydiphenyl and terephthalic acid.

The following substances were weighed into a 1-l three-necked flask equipped with stirrer, distillation attachment and nitrogen inlet:
65.75 g=0.232 mol of N-(3-hydroxyphenyl)-trimellitic acid imide
192.79 g=1.394 mol of p-hydroxybenzoic acid
115.78 g=0.697 mol of terephthalic acid
129.77 g=0.697 mol of 4,4'-dihydroxydiphenyl
339.16 g=3.32 mol of acetic acid anhydride
0.225 g of germanium dioxide
0.225 g of the potassium salt of hydroxyquinone sulphonic acid.

After repeated evacuation and flushing with nitrogen, the apparatus was heated to 170° C. in the course of 30 minutes. In the course of a further 4 hours, the temperature was raised stepwise to 320° C. A vacuum was applied at this temperature and the pressure was continuously reduced to 0.8 mbar. After 25 minutes under this vacuum, the heating bath was removed and the product isolated by smashing the flask after cooling. A light beige fibrous polyester imide was obtained. This product was insoluble in all the solvents used, e.g. p-chlorophenol and phenol/1,1,2,2-tetrachloroethane (ratios by weight 1:1).

An anisotropic melt phase was observed above 260° C. under the polarisation microscope. Using an Arburg injection moulding apparatus, Model 170 Mini, test samples were produced at a material temperature of 310° C. and a mould temperature of 130° C. and the samples were then stored for 10 hours at 200° C. The HDT-A temperature of this polyester imide was 206° C. The following mechanical properties were found:
$a_n$ (IZOD, ISO 180 Method 1c): 23.2 KJ.m$^{-2}$ (impact strength)
$E_B$: 9940 MPa (modulus in flexure)
$\sigma_B$: 152 MPa (flexural strength).

EXAMPLES 3 to 5

Additional thermotropic polyester imides were prepared in the apparatus described in Example 2 and by the process described there. The compositions of the products and the results of the HDT-A test and investigation under the polarization microscope are shown in the following Table:

| Example | N-HTS[1] | pHB[2] [Mol %] | DOD[3] | TS[4] | HDT-A (°C.) | anisotropic melt |
|---|---|---|---|---|---|---|
| 3 | 10 | 70 | 20 | 20 | 195 | >255° C. |
| 4 | 20 | 50 | 30 | 30 | 169 | >240° C. |
| 5 | 30 | 40 | 30 | 30 | 168 | >235° C. |
| 6 | 40 | 20 | 40 | 40 | 168 | >270° C. |
| 7 | 40 | 30 | 30 | 30 | 168 | >280° C. |
| 8 | 40 | 40 | 20 | 20 | 160 | >260° C. |

[1]N-HTS = N-(3-hydroxyphenyl)-trimellitic acid imide
[2]pHB = p-hydroxybenzoic acid
[3]DOD = 4,4'-dihydroxydiphenyl
[4]TS = terephthalic acid

| Example | $a_n$ IZOD according to ISO 180 Method 1c (KJ/m$^{-2}$) | $E_B$ (MPa) | $\sigma_B$ (MPa) |
|---|---|---|---|
| 3 | 36.4 | 10 170 | 169 |
| 4 | 32.6 | 10 770 | 193 |
| 5 | 44.0 | 10 750 | 218 |
| 6 | 16.5 | 6 370 | 129 |
| 7 | 25.1 | 10 000 | 196 |
| 8 | 16.4 | 8 560 | 152 |

We claim:
1. Thermotropic polyester imide having recurrent structural units corresponding to the following formulae:

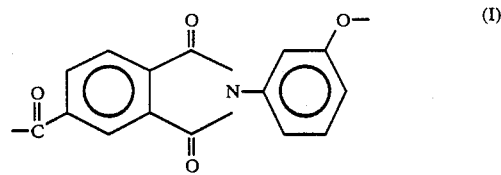
(I)

-continued

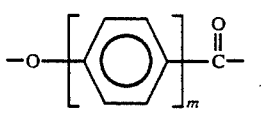
(II)

(III)

and

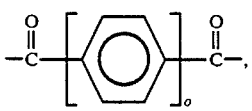
(IV)

and containing the condensed residues (I) in a quantity of from 5 to 50 mol % and (II) in a quantity of from 10 to 75 mol % based on the sum of the condensed residues (I) to (IV), the molar ratio of the condensed residues (III)/(IV) being from 0.95 to 1.05 with the condition that the total concentration of the condensed residues (I) and (II) is from 10 to 85 mol %, based on the sum of the condensed residues (I) to (IV) and m, n and o are 1 or 2.

2. Polyester imide according to claim 1, containing the condensed residues (I) in a quantity of from 8 to 45 mol %, based on the sum of condensed residues (I) to (IV).

3. Polyester imide according to claim 1 containing the condensed residues (I) in a quantity of from 10 to 40 mol %, based on the sum of the condensed residues (I) to (IV).

4. Polyester imide according to claim 1 containing the condensed residues (II) in a quantity of from 20 to 70 mol %, based on the sum of the condensed residues (I) to (IV).

5. Polyester imide according to claim 1 characterised in that m and o=1 and n=2.

6. Process for the preparation of the polyester imide according to claim 1 characterised in that hydroxy carboxylic acids derived from residue (I) or reactive derivatives thereof are reacted with hydroxy carboxylic acids derived from residue (II) or reactive derivatives thereof and with diphenols and dicarboxylic acids derived from residues (III) and (IV) or reactive derivatives thereof, at temperatures of from 150° to 380° C.

7. A composition comprising the polyester imide according to claim 1 and containing from 5 to 65% by weight of a reinforcing agent or filler.

8. The process of claim 6 further comprising subjecting the polyester imide to a solid phase after-condensation to increase the molecular weight.

9. The process of claim 6 wherein the reaction is carried out in the presence of a catalyst.

10. The process of claim 6 wherein the reaction is carried out in the presence of chain terminating agents and branching agents.

11. The process of claim 6 wherein the reaction is carried out at reduced pressure.

* * * * *